United States Patent
Lee et al.

(10) Patent No.: US 8,130,877 B2
(45) Date of Patent: Mar. 6, 2012

(54) APPARATUS AND METHOD FOR DETECTING SIGNAL IN MULTI-ANTENNA SYSTEM

(75) Inventors: Joo-Hyun Lee, Suwon-si (KR);
Sang-Boh Yun, Seongnam-si (KR);
Sung-Soo Hwang, Yongin-si (KR);
Yong-Soo Cho, Seoul (KR); Jae-Kwon Kim, Wonju-si (KR); Tae-Ho Im, Seoul (KR)

(73) Assignees: Samsung Electronics Co., Ltd., Suwon-si (KR); Chung-Ang University Industry-Academy Cooperation Foundation, Seoul (KR)

( * ) Notice: Subject to any disclaimer, the term of this patent is extended or adjusted under 35 U.S.C. 154(b) by 673 days.

(21) Appl. No.: 12/259,874

(22) Filed: Oct. 28, 2008

(65) Prior Publication Data

US 2009/0116590 A1 May 7, 2009

(30) Foreign Application Priority Data

Nov. 6, 2007 (KR) .................. 10-2007-0112837

(51) Int. Cl.
*H04L 27/06* (2006.01)
(52) U.S. Cl. ........................................... 375/341
(58) Field of Classification Search .................. 375/262, 375/341; 704/242; 714/795
See application file for complete search history.

(56) References Cited

U.S. PATENT DOCUMENTS

| | | | |
|---|---|---|---|
| 2004/0146025 A1* | 7/2004 | Hwang et al. | 370/334 |
| 2004/0170233 A1 | 9/2004 | Onggosanusi et al. | |
| 2004/0208254 A1* | 10/2004 | Lee et al. | 375/260 |
| 2005/0018789 A1* | 1/2005 | Jia et al. | 375/316 |
| 2007/0116143 A1 | 5/2007 | Bjerke et al. | |
| 2008/0095257 A1* | 4/2008 | Maeda et al. | 375/262 |
| 2008/0152027 A1* | 6/2008 | Kalluri et al. | 375/260 |

* cited by examiner

*Primary Examiner* — Sam K Ahn
(74) *Attorney, Agent, or Firm* — Jefferson IP Law, LLP

(57) ABSTRACT

A method and an apparatus for detecting a signal in a multi-antenna system using a spatial multiplexing are provided. The apparatus includes at least one antenna for receiving a signal, a channel estimator for estimating a channel using the received signal, a detector for calculating multiplication values commonly used to determine a Euclidean distance using the receive signal and channel information and for detecting a transmitted signal by calculating Euclidean distances of one or more candidate symbols using the receive signal and the determined multiplication values and a decoder for demodulating and decoding the detected signal. Hence, the computational complexity of the signal detection can be mitigated.

17 Claims, 7 Drawing Sheets

APPARATUS AND METHOD FOR DETECTING SIGNAL IN MULTI-ANTENNA SYSTEM

PRIORITY

This application claims the benefit under 35 U.S.C. §119 (a) of a Korean patent application filed in the Korean Intellectual Property Office on Nov. 6, 2007 and assigned Serial No. 10-2007-0112837, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and Chung-Ang University Industry-Academy Cooperation Foundation.

BACKGROUND OF THE INVENTION

1. Field of the Invention

The present invention relates to an apparatus and a method for detecting a signal in a multi-antenna system. More particularly, the present invention relates to an apparatus and a method for detecting a signal with low complexity in a multi-antenna system using a spatial multiplexing scheme.

2. Description of the Related Art

Rapid growth of the wireless mobile communication market has created demand for various multimedia services in a radio environment. Many of the multimedia services require the transmission of a very large amount of data at a high data rate to provide the multimedia services. Accordingly, research is being conducted on a Multiple-Input Multiple-Output (MIMO) system which is able to transmit a large amount of data at a high data rate by the efficient utilization of limited frequencies.

Compared to a single-antenna system, the MIMO system can increase a channel transmission reliability and a data rate by transmitting data over independent channels per antenna, without the use of additional frequencies or an increase in transmission power.

When the MIMO system adopts a spatial multiplexing scheme, a transmitter can achieve a rapid data transmission by transmitting different information over multiple transmit antennas respectively. Via receive antennas, a receiver receives a signal including the transmitted signals having the different information from the transmit antennas. Accordingly, the receiver needs to separate the multiplexed signal on the basis of the antenna using a detection scheme. For example, the receiver may detect the multiplexed signal using a Zero-Forcing (ZF), a Minimum Mean Square Error (MMSE), an Order Successive Interference Cancellation (OSIC), and a Maximum Likelihood (ML) method. Alternatively, the receiver may adopt a suboptimal detection method such as sphere decoding, QR Decomposition-M, MOC, and QRD OSIC (QOC), to detect the multiplexed signal.

Using the ML estimation, the receiver selects a signal vector having a minimum square Euclidean distance to the receive signal among all the signal vectors transmittable from the transmitter. Thus, the receiver can achieve the optimum performance by means of the ML method. However, as the number of the transmit antennas and the modulation order increase, the computational complexity of the ML estimation increases as well.

Using the sphere decoding method, the receiver attains similar performance to the ML method. However, it is difficult to calculate a radius of the initial sphere and the computational complexity rises in a worst case.

Using the QRD-M method, the receiver is subject to severe performance variation depending on the number of candidate groups. If there are a large number of candidate groups, the receiver can obtain performance substantially similar to the ML method. However, the computational complexity rises.

Using the MOC or the QOC methods, the receiver obtains performance similar to the ML method with lower computation complexity than the QRD-M. Yet, as the number of the transmit antennas, receive antennas and modulation order increase, its computational complexity rises.

As discussed above, in detecting the multiplexed signals, the receiver is subject to high computational complexity in a MIMO system using the spatial multiplexing scheme. Therefore, an apparatus and method for achieving an optimum performance with lower computational complexity in a MIMO system using a spatial multiplexing scheme are needed.

SUMMARY OF THE INVENTION

An aspect of the present invention is to address at least the above mentioned problems and/or disadvantages and to provide at least the advantages described below. Accordingly, an aspect of the present invention is to provide an apparatus and a method for lowering computational complexity in a Multiple Input Multiple Output (MIMO) system using a spatial multiplexing scheme.

Another aspect of the present invention is to provide an apparatus and a method for lowering computational complexity by normalization of a real part and an imaginary part of a receive symbol to integers at a receiver in a MIMO system using a spatial multiplexing scheme.

Yet another aspect of the present invention is to provide an apparatus and a method for making multiplications required to determine a square of a Euclidean distance using a front-end processor and for detecting a multiplexed signal using the acquired values at a receiver in a MIMO system using a spatial multiplexing scheme.

In accordance with an aspect of the present invention, an apparatus for detecting a signal at a receiver in a multi-antenna system using a spatial multiplexing is provided. The apparatus includes at least one antenna for receiving a signal, a channel estimator for estimating a channel using the received signal, a detector for calculating multiplication values commonly used to determine a Euclidean distance using the received signal and channel information and for detecting a transmitted signal by calculating Euclidean distances of one or more candidate symbols using the received signal and the determined multiplication values and a decoder for demodulating and decoding the detected signal.

In accordance with another aspect of the present invention, a method for detecting a signal at a receiver in a multi-antenna system using a spatial multiplexing is provided. The method includes estimating a channel using a received signal, determining multiplication values commonly used to determine a Euclidean distance using the received signal and channel information, detecting the signal by determining Euclidean distances of one or more candidate symbols using the determined multiplication values and the received signal and demodulating and decoding the detected signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the following description, it is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technique for detecting a signal with low complexity in a Multiple Input Multiple Output (MIMO) system using spatial multiplexing.

Although the MIMO system described below includes a transmitter having four transmit antennas and a receiver having four receive antennas, this is merely for example and the present invention is not so limited. That is, the present invention is also applicable to a MIMO system wherein the transmitter and the receiver each have any number of a plurality of antennas.

Figure 1:
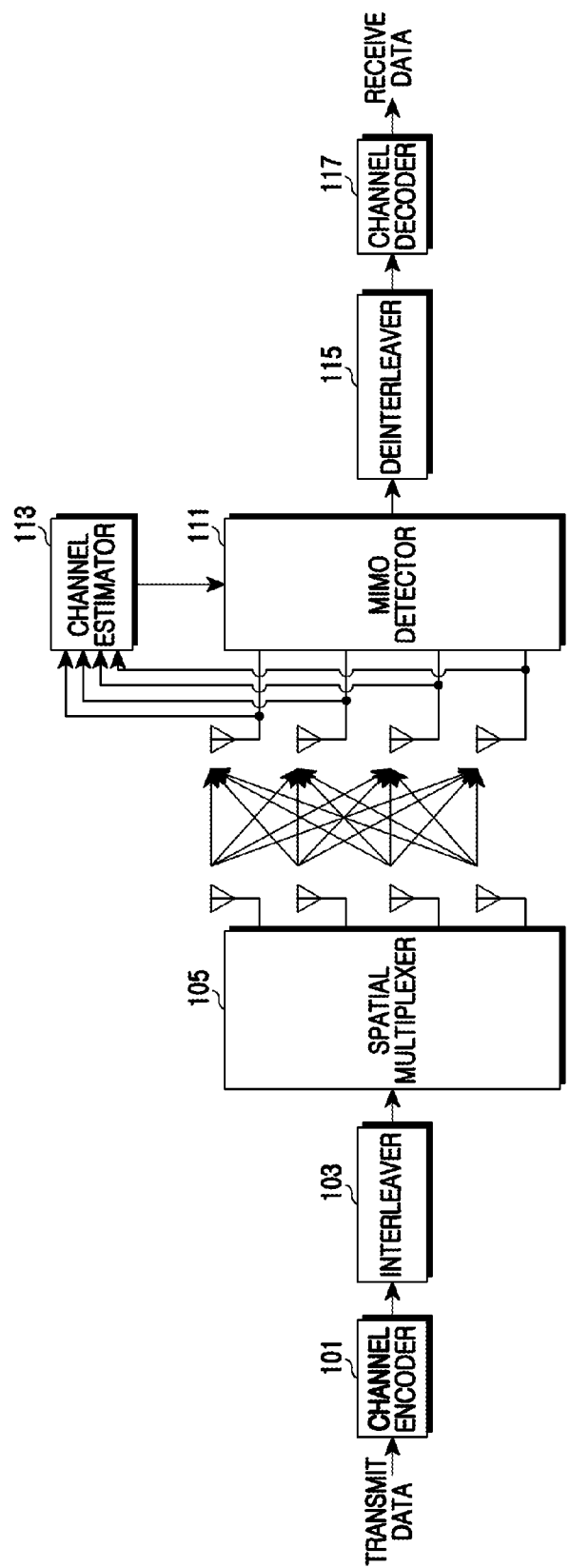
FIG. 1 illustrates a MIMO system according to an exemplary embodiment of the present invention.

FIG. 1 is a block diagram of a MIMO system according to an exemplary embodiment of the present invention.

The MIMO system of FIG. 1 includes a transmitter having four transmit antennas and a receiver having four receive antennas.

The transmitter includes a channel encoder 101, an interleaver 103, and a spatial multiplexer 105.

The channel encoder 101 outputs encoded symbols by coding an information bit stream to be sent to the receiver at a corresponding code rate. The interleaver 103 interleaves the symbols output from the channel encoder 101 according to a prescribed interleaving rule, making them robust to burst errors.

The spatial multiplexer 105 spatially-multiplexes the symbols output from the interleaver 103 to transmit them over the transmit antennas respectively. For example, using an Orthogonal Frequency Division Multiplexing (OFDM) scheme, the transmitter OFDM-modulates the streams output from the spatial multiplexer 105. Next, the transmitter converts the OFDM-modulated signals to Radio Frequency (RF) signals to be transmittable over the air and transmits the RF signals to the receiver via the respective antennas. Herein, the OFDM modulation indicates an Inverse Fast Fourier Transform (IFFT) operation.

The receiver includes a MIMO detector 111, a channel estimator 113, a deinterleaver 115, and a channel decoder 117.

The MIMO detector 111 detects a signal to be received from the transmitter from the multiplexed signals received via the receive antennas. The MIMO detector 111 executes multiplications required to determine Euclidean distances using a front-end multiplier. Also, the MIMO detector 111 determines Euclidean distances between the symbol vectors transmittable by the transmitter and the received signal using the values acquired by the front-end multiplier. The MIMO detector 111 selects the symbol vector having the shortest Euclidean distance from among the transmittable symbol vectors of the transmitter as the signal to receive from the transmitter. In so doing, the MIMO detector 111 can normalize a real part and an imaginary part of the symbols of the received signal to integers so that the front-end multiplier can multiply merely with a shift operation and an add operation, thus lowering the computational complexity. Herein, although a normalizer for the normalization is not illustrated, the normalizer can be included to the MIMO detector 111 or positioned in front of the MIMO detector 111. In the following description, it is assumed that the MIMO detector 111 includes the normalizer.

The channel estimator 113 estimates a channel using the signals received via the receive antennas.

The deinterleaver 115 deinterleaves the signal output from the MIMO detector 111 according to the interleaving rule of the interleaver 103 of the transmitter.

The channel decoder 117 detects data transmitted from the transmitter by decoding the signal output from the deinterleaver 115 at a corresponding code rate.

As discussed above, the MIMO detector 111 of the receiver determines the Euclidean distances of the transmittable symbol vectors using the multiplications of the front-end multiplier and detects the signal transmitted from the transmitter based on the multiplexed signals. The MIMO detector 111 can employ a signal detection method such as Maximum Likelihood (ML), ML using QR Decomposition (QRD), QRD-M, and QR decomposition Order successive interference Cancellation (QOC). The ML, the ML using the QRD, and the QRD-M are well known in the art and their explanation shall be omitted here.

Using the ML method, the receiver detects the signal based on Equation (1).

$$X_{ML} = \mathrm{argmax}_x P(y|x) = \mathrm{argmax}_x \|y - Hx\|^2 \tag{1}$$

In Equation (1), $X_{ML}$ denotes a signal selected using the ML method from the transmit signals transmittable from the transmitter, y denotes a signal received via the receive antennas, x denotes a transmit signal sent from the transmitter, P(y|x) denotes a conditional probability of the receive signal y given the transmit signal x, and H denotes a channel matrix between the transmitter and the receiver.

Using the ML method based on Equation (1), the receiver detects the transmit symbol vector having the shortest Euclidean distance to the receive signal from among the transmit symbol vectors transmittable by the transmitter. For doing so, the MIMO detector 111 of the receiver needs to carry out the operation of Equation (1) with respect to every transmit symbol vector transmittable from the transmitter.

The operation for calculating the Euclidean distance in Equation (1) can be expressed as Equation (2).

$$\|y - Hx\|^2 = yy^H - y^H Hx - (y^H Hx)^H + x^H H^H Hx \tag{2}$$
$$= \|y\|^2 + 2R\{(y^H H)x\} + \|H\|^2 \|x\|^2$$

In Equation (2), y denotes a signal received via the receive antennas, x denotes a transmit signal sent from the transmitter, and H denotes a channel matrix between the transmitter and the receiver.

As the values of y and H are fixed in Equation (2), $\|y\|^2$, $y^H H$, and $\|H\|^2$ are also applied to the calculation of the Euclidean distances of all of the transmittable symbol vectors of the transmitter. Accordingly, the MIMO detector 111 of the receiver stores the multiplication values that are applied to the calculation of the Euclidean distance using the front-end multiplier. In an exemplary implementation, the multiplication values are stored in a memory separate from the MIMO detector 111. The MIMO detector 111 determines the Euclidean distances of the transmit symbol vectors using the stored multiplication values.

Figure 2:
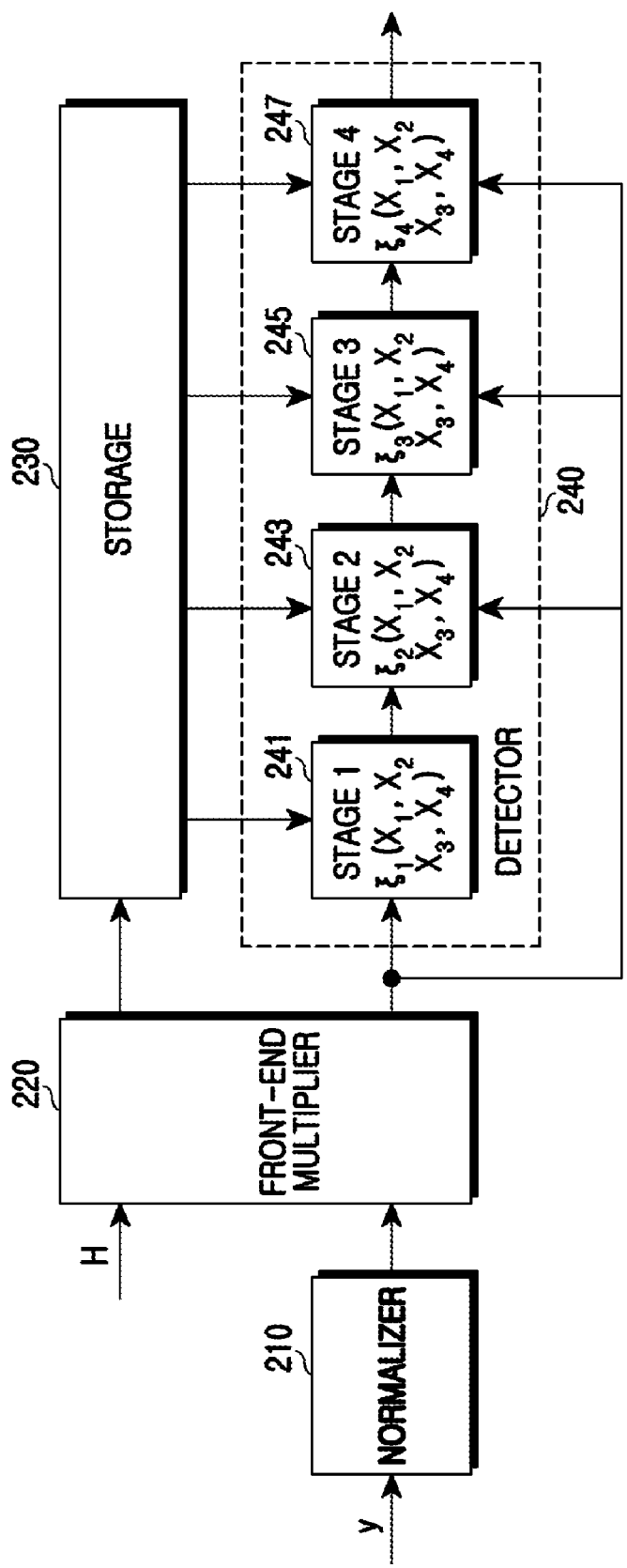
FIG. 2 illustrates a MIMO detector in a MIMO system according to an exemplary embodiment of the present invention.

An exemplary MIMO detector of a receiver using an ML method is constructed as shown in FIG. 2.

FIG. 2 is a block diagram of a MIMO detector in a MIMO system according to an exemplary embodiment of the present invention.

The MIMO detector of FIG. 2 includes a normalizer 210, a front-end multiplier 220, a storage 230, and a detector 240.

The normalizer 210 normalizes the real part and the imaginary part of the symbols of the signal received via the receive antennas, to integer values. For example, using 16 Quadrature Amplitude Modulation (QAM), the transmit symbol transmittable from the transmitter can be expressed as Equation (3).

$$x_i \in \begin{bmatrix} \frac{1+j}{\sqrt{10}} & \frac{-1+j}{\sqrt{10}} & \frac{-1-j}{\sqrt{10}} & \frac{1-j}{\sqrt{10}} \\ \frac{1+3j}{\sqrt{10}} & \frac{-1+3j}{\sqrt{10}} & \frac{-1-3j}{\sqrt{10}} & \frac{1-3j}{\sqrt{10}} \\ \frac{3+j}{\sqrt{10}} & \frac{-3+j}{\sqrt{10}} & \frac{-3-j}{\sqrt{10}} & \frac{3-j}{\sqrt{10}} \\ \frac{3+3j}{\sqrt{10}} & \frac{-3+3j}{\sqrt{10}} & \frac{-3-j}{\sqrt{10}} & \frac{3-3j}{\sqrt{10}} \end{bmatrix} \tag{3}$$

In Equation (3), $x_i$ denotes an $i^{th}$ transmit symbol.

Based on Equation (3), the real part and the imaginary part of the transmit symbols transmittable from the transmitter using the 16QAM have real values. The normalizer 210 normalizes by multiplying the receive symbols by $\sqrt{10}$ so as to make both the real part and the imaginary part of the receive symbols received over the receive antennas integer values.

The front-end multiplier 220 determines multiplication values commonly used for the MIMO detector 111 to compute the Euclidean distances. More specifically, the front-end multiplier 220 determines $\|y\|^2$, $y^H H$, and $\|H\|^2$ which are commonly applied to determine the Euclidean distances of the symbol vectors at the MIMO detector 111.

The storage 230 stores the multiplication values determined at the front-end multiplier 220.

The detector 240 determines the Euclidean distances between the received signal and the transmit symbol vectors transmittable by the transmitter using the multiplication values stored in the storage 230 in accordance with Equation (2). To determine the Euclidean distances, the detector 240 only executes a shift operation and an add operation using the stored multiplication values and the normalized receive symbols. For instance, to determine the square of the Euclidean distance based on Equation (2) in a MIMO system using the 16QAM, the detector 240 receives $\|y\|^2$, $y^H H$, and $\|H\|^2$ from the storage 230. The real part and the imaginary part of the transmittable transmit symbol vector x have the integer value of '1' or '3' through the normalization. Hence, the detector 240 can acquire $2R\{(y^H H)x\}$ by carrying out the operation on $y^H H$ and x merely using the shift operation and the add operation. Furthermore, the detector 240 is divided into as many stages as there are transmit antennas. In this example, because there are four transmit antennas the detector includes stages 241, 243, 245 and 247 that are provided for detection of the shortest Euclidean distance for each transmit antenna.

Figure 3:
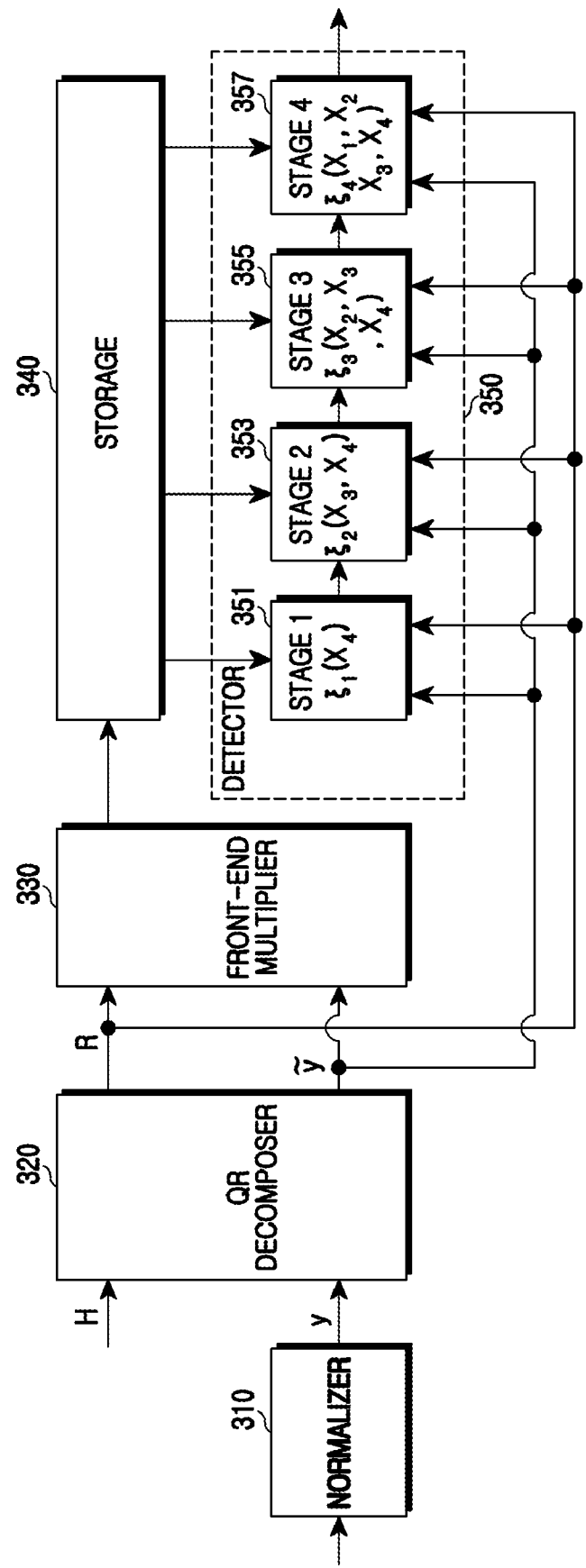
FIG. 3 illustrates a MIMO detector using QR decomposition in a MIMO system according to an exemplary embodiment of the present invention.

An exemplary MIMO detector of a receiver using the ML method with the QR decomposition is constructed as shown in FIG. 3. When detecting the signal using the MIMO detector with the ML method as shown in FIG. 2, the receiver can alleviate the complexity of the multiplication but increase the complexity of the shift operation and the add operation. However, through the QR decomposition, the MIMO detector 111 can mitigate the computational complexity in the shift operation and the add operation.

FIG. 3 is a block diagram of a MIMO detector using QR decomposition in a MIMO system according to an exemplary embodiment of the present invention.

The MIMO detector of FIG. 3 includes a normalizer 310, a QR decomposer 320, a front-end multiplier 330, a storage 340, and a detector 350.

The normalizer 310 normalizes the real part and the imaginary part of the symbols of the signal received via the receive antennas, to integers.

The QR decomposer 320 conducts the QR decomposition on the channel matrix between the transmitter and the receiver. Herein, the QR decomposer 320 applies the QR decomposition on the channel matrix based on Equation (4).

$$y = Hx + n = QRx + n \quad (4)$$

$$Q^H Q = I, \quad R = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}$$

In Equation (4), y denotes a receive signal vector, H denotes a channel matrix, x denotes a transmit signal vector, and n denotes noise vector. Q denotes a matrix which becomes a unit matrix after multiplying by its Hermitian matrix, and R denotes an upper triangular matrix which becomes the channel matrix by multiplying by the matrix Q.

The QR decomposer 320 transforms the receive signal to facilitate interference cancellation between the antennas by multiplying the receive signal by $Q^H$ as expressed in Equation (5) so that the signal is detected using the property of the matrix R based on Equation (4).

$$Q^H y = QRx + Q^H n$$

$$\tilde{y} = Rx + \tilde{n} \quad (5)$$

In Equation (5), y denotes a receive signal vector, x denotes a transmit signal vector, and n denotes noise vector. Q denotes a matrix which becomes a unit matrix after multiplying by its Hermitian matrix, and R denotes an upper triangular matrix which becomes the channel matrix by multiplying by the matrix Q.

The front-end multiplier 330 determines multiplication values commonly used for the MIMO detector 111 to compute the Euclidean distances between the receive signal and the transmittable symbol vectors of the transmitter. More specifically, the front-end multiplier 330 determines $\|y\|^2$, $y^H H$, and $\|H\|^2$ which are commonly applied to determine the Euclidean distances at the MIMO detector 111 based on Equation (2).

The storage 340 stores the multiplication values determined at the front-end multiplier 330.

The detector 350 determines the Euclidean distances of the transmit symbol vectors transmittable by the transmitter using the multiplication values stored to the storage 340 in accordance with Equation (2). To determine the Euclidean distances of the transmit symbol vectors, the detector 350 executes the shift operation and the add operation using the multiplication values stored to the storage 340 and the rearranged receive symbols through the QR decomposition.

When the detector 350 detects the signal using the rearranged expression through the QR decomposition as expressed in Equation (5), Equation (2) can be rearranged as Equation (6).

$$\left\| \begin{bmatrix} \tilde{y}_1 \\ \tilde{y}_2 \\ \tilde{y}_3 \\ \tilde{y}_4 \end{bmatrix} - \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} x_1 \\ x_2 \\ x_3 \\ x_4 \end{bmatrix} \right\|^2 = \quad (6)$$

$$\xi_1(x_4) + \xi_2(x_3, x_4) + \xi_3(x_2, x_3, x_4) + \xi_4(x_1, x_2, x_3, x_4)$$

In Equation (6), $\tilde{y}_i$ denotes symbols received via the $i^{th}$ receive antenna through the QR decomposition, $r_{ij}$ denotes an element of the upper triangular matrix which becomes the channel matrix after multiplying by the matrix Q, and $x_i$ denotes symbols transmitted over the $i^{th}$ transmit antenna.

The MIMO detector 111 separately conducts the operation $\xi_i$ of Equation (6) by dividing the detector 350 into as many stages as there are transmit antennas. In this example, the MIMO detector 111 divides the detector 350 into four stages, one stage for each of the four transmit antennas. For example, the first stage 351 of the detector 350 executes the $\xi_1(x_4)$ operation based on Equation (7).

$$\xi_1(x_4) = |\tilde{y}_4 - r_{44}x_4|^2 \quad (7)$$

$$= |\tilde{y}_4|^2 + 2R\{(\tilde{y}_4^H r_{44})x_4\} + r_{44}^2 |x|^2$$

In Equation (7), $\tilde{y}_4$ denotes a symbol received over the fourth receive antenna transformed through the QR decomposition, $r_{44}$ denotes an element of the upper triangular matrix which becomes the channel matrix after multiplying by the matrix Q, and $x_4$ denotes a symbol transmitted over the fourth transmit antenna.

The first stage 351 of the detector 350 executes the operation $\xi_1(x_4)$ using $|y_4|^2$, $y^H_4 r_{44}$ and $r_{44}^2$ provided from the storage 340 based on Equation (7). Similarly, the second stage 353, third stage 355 and fourth stage 357 respectively execute operations $\xi_2(x_3, x_4)$, $\xi_3(x_2, x_3, x_4)$ and $\xi_4(x_1, x_2, x_3, x_4)$ using the appropriate variables provided from the storage 340 based on Equation (6).

As stated above, the receiver pre-determines and reuses the multiplication values overlapping in the signal detection using the ML method. For the signal detection, the receiver normalizes the real part and the imaginary part of the receive symbols to integer values and transforms the multiplication operation to the shift operation and the add operation. In so doing, the receiver can mitigate the implementation complexity of the signal detector as illustrated in Table 1. Table 1 shows the complexity when the multiplication and the addition are realized using an Application Specific Integrated Circuit (ASIC) gate. In the multiplication and the addition at the ASIC, Table 1 assumes that the multiplication is 12 times more complicated than the addition.

TABLE 1

| 4 × 4 MIMO system | number of multiplications | number of additions | number of ASIC gates |
|---|---|---|---|
| General ML | 4,718,592 | about 400,000 | 912,369,664 |
| ML using normalization | 524,288 | about 620,000 | 110,583,296 |
| Reuse ML of overlapping part | 200 | about 1,500,000 | 24,038,400 |
| Reuse ML of overlapping part using QR decomposition | 256 (QR decomposition) + 84 = 340 | about 200,000 | 3,265,280 |

Since the complexity of the multiplication operation is greater than that of the add operation as shown in Table 1, an exemplary receiver of the present invention detects the signal by pre-determining and reusing the multiplication values overlapping in the signal detection using the ML method, or by normalizing the real part and the imaginary part of the receive symbols to integer values and converting the multiplication operation to the shift operation and the add operation, thus mitigating the computational complexity.

The signal detection schemes of the MIMO detector 111 have different candidate transmit symbol vectors but execute the same operation as in Equation (2) to determine the Euclidean distances of the candidate transmit symbol vectors.

Hence, with the QRD-M scheme or the QOC scheme, the MIMO detector 111 determines the Euclidean distances of the transmit symbol vectors based on Equation (2).

Figure 4:
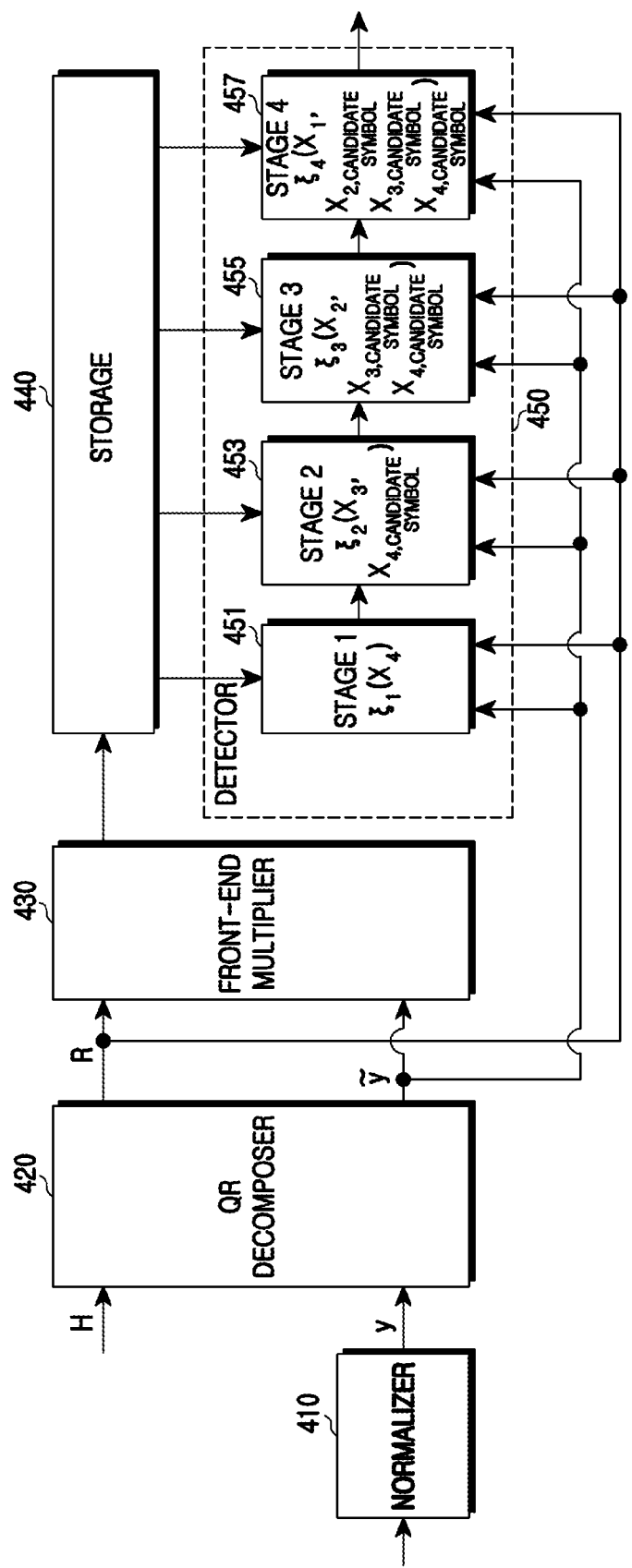
FIG. 4 illustrates a detector using QRD-M in a MIMO system according to an exemplary embodiment of the present invention.

An exemplary MIMO detector using the QRD-M scheme is constructed as shown in FIG. 4.

FIG. 4 is a block diagram of a MIMO detector using the QRD-M scheme in a MIMO system according to an exemplary embodiment of the present invention.

Referring to FIG. 4, the MIMO detector includes a normalizer 410, a QR decomposer 420, a front-end multiplier 430, a storage 440, and a detector 450.

The normalizer 410 normalizes the real part and the imaginary part of the symbols of the signal received via the receive antennas to integers.

The QR decomposer 420 conducts the QR decomposition on the channel matrix between the transmitter and the receiver. More particularly, the QR decomposer 420 transforms the receive signal to facilitate interference cancellation between the antennas by multiplying the receive signal by $Q^H$ as expressed in Equation (5) so that the signal is detected using the property of the matrix R based on Equation (4).

The front-end multiplier 430 determines multiplication values commonly used for the MIMO detector 111 to compute the Euclidean distances between the receive signal and the transmittable symbol vectors of the transmitter. More specifically, the front-end multiplier 430 determines $\|y\|^2$, $y^H H$, and $\|H\|^2$ which are commonly applied to determine the Euclidean distances at the MIMO detector 111 based on Equation (2).

The storage 440 stores the multiplication values determined at the front-end multiplier 430.

The detector 450 determines the Euclidean distances to the transmit symbol vectors transmittable by the transmitter using the multiplication values stored in the storage 440 in accordance with Equation (2). To determine the Euclidean distances of the transmit symbol vectors, the detector 450 executes the shift operation and the add operation on the multiplication values stored in the storage 440 and the rearranged receive symbols through the QR decomposition.

Using the QRD-M, the MIMO detector selects M-ary candidates having the shortest accumulated squared Euclidean distance in each step of the tree search. In further detail, the MIMO detector divides the detector 450 into as many stages as there are transmit antennas. In this example, the MIMO detector 111 divides the detector 450 into four stages, one stage for each of the four transmit antennas. Next, the MIMO detector selects M-ary candidates having the shortest squared Euclidean distance in each stage of the detector 450. For example, to square the Euclidean distance based on Equation (6), the first stage 451 of the detector 450 executes the $\xi_1(x_4)$ operation as expressed in Equation (7). The first stage 451 selects the M-ary candidates $x_4$ having the small squared Euclidean distance by computing the Euclidean distances of every symbol transmittable in $x_4$.

Next, the second stage 453 of the detector 450 selects M-ary candidates $x_3$ having the shortest squared Euclidean distance using the M-ary candidates $x_4$ selected in the first stage 451. The first stage 451 of the detector 450 carries out the real multiplication 5 times and the second stage 453 carries out the real multiplication 13 times. The third stage 455 of the detector 450 carries out the real multiplication 25 times and the fourth stage 457 carries out the real multiplication 41 times. That is, in the signal detector using the QRD-M in the 4×4 MIMO system, the detector 450 of the receiver executes the real multiplication 84 times in total.

Figure 5:
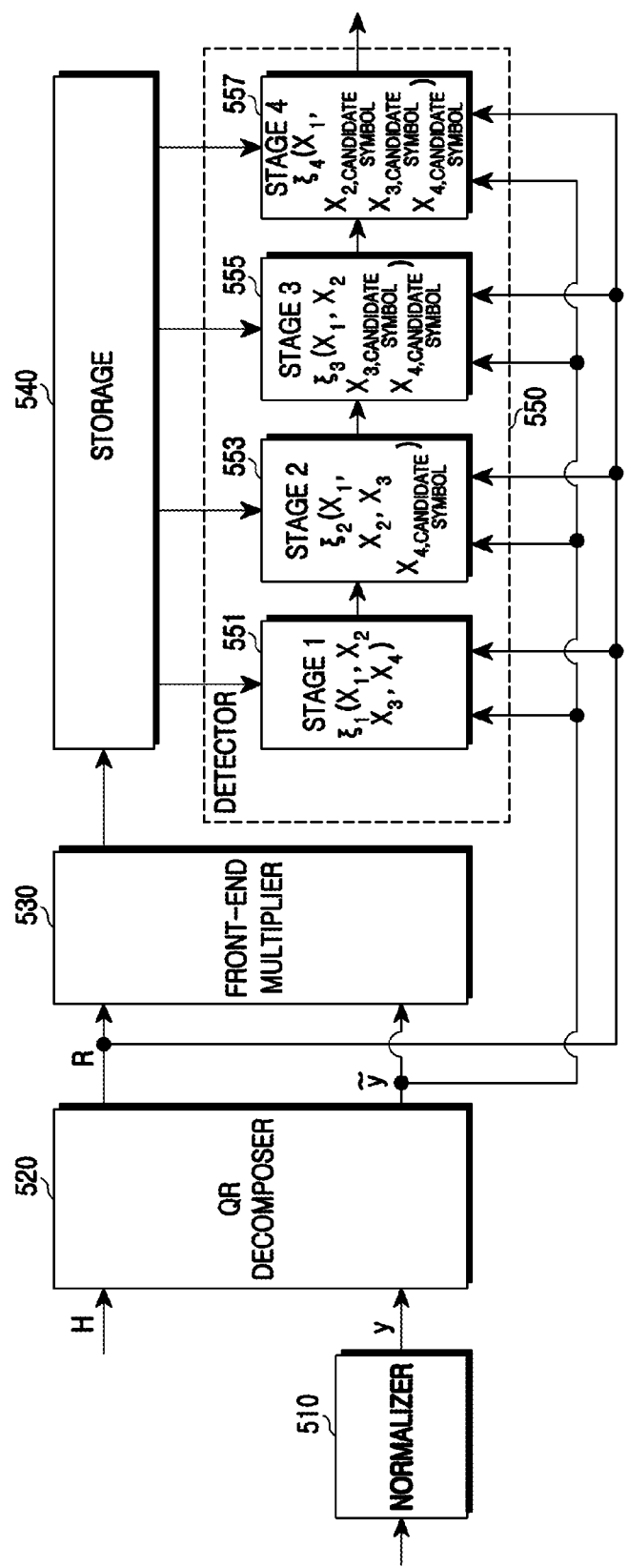
FIG. 5 illustrates a detector using QOC in a MIMO system according to an exemplary embodiment of the present invention.

An exemplary MIMO detector using QOC is constructed as shown in FIG. 5.

FIG. 5 is a block diagram of a MIMO detector using QOC in a MIMO system according to an exemplary embodiment of the present invention.

Referring to FIG. 5, the MIMO detector includes a normalizer 510, a QR decomposer 520, a front-end multiplier 530, a storage 540, and a detector 550.

The normalizer 510 normalizes the real part and the imaginary part of the symbols of the signal received via the receive antennas to integers.

The QR decomposer 520 conducts the QR decomposition on the channel matrix between the transmitter and the receiver. More particularly, the QR decomposer 520 transforms the receive signal to facilitate interference cancellation between the antennas by multiplying the receive signal by $Q^H$ as expressed in Equation (5) so that the signal is detected using the property of the matrix R based on Equation (4).

The front-end multiplier 530 determines multiplication values commonly used for the MIMO detector 111 to compute the Euclidean distances between the receive signal and the transmittable symbol vectors of the transmitter. More specifically, the front-end multiplier 530 determines $\|y\|^2$, $y^H H$, and $\|H\|^2$ which are commonly applied to determine the Euclidean distances of the symbol vectors at the MIMO detector 111 based on Equation (2).

The storage 540 stores the multiplication values determined at the front-end multiplier 530.

The detector 550 determines the Euclidean distances to the transmit symbol vectors transmittable by the transmitter using the multiplication values stored in the storage 540 in accordance with Equation (2). To determine the Euclidean distances of the transmit symbol vectors, the detector 550 executes the shift operation and the add operation on the multiplication values stored in the storage 540 and the rearranged receive symbols through the QR decomposition.

Using the QOC, the MIMO detector selects a transmit symbol having the shortest squared Euclidean distance from the transmit symbols $x_4$ transmittable via the fourth transmit antenna of the transmitter based on Equation (6). For example, the MIMO detector assumes that the fourth transmit antenna sends one particular transmit symbol of the transmittable transmit symbols, and determines the transmit symbols of the other transmit antennas through a slicing operation. The MIMO detector applies the above-described process to every transmit symbol of the transmitter and thus selects the transmit symbol of the shortest squared Euclidean distance. At this time, the MIMO detector selects only the transmit symbol of the fourth transmit antenna and discards the transmit symbols of the other transmit antennas produced through the slicing operation.

Next, the MIMO detector selects the transmit symbol having the shortest squared Euclidean distance from the transmittable transmit symbols $x_3$ of the third transmit antenna by applying the selected $x_4$. The MIMO detector divides the detector 550 into the same number of stages as the number of transmit antennas. In this example, the MIMO detector divides the detector 550 into four stages, one stage for each of the four transmit antennas. Next, the MIMO detector determines the square of the Euclidean distance in each divided stage of the detector 550. For example, to detect the signals using the QOC, the first stage 551 of the detector 550 performs the operation $\xi_1(x_1,x_2,x_3,x_4)$ based on Equation (8).

$$x_4 = C(i), i = 1:|C|$$

$$x_3 = \text{slice}\left(\frac{\tilde{y}_3 - r_{34}x_4}{r_{33}}\right)$$

$$x_2 = \text{slicer}\left(\frac{\tilde{y}_2 - r_{23}x_3 - r_{24}x_4}{r_{22}}\right)$$

$$x_1 = \text{slicer}\left(\frac{\tilde{y}_1 - r_{12}x_2 - r_{13}x_3 - r_{14}x_4}{r_{11}}\right)$$

(8)

In Equation (8), $x_i$ denotes transmittable symbols of the $i^{th}$ transmit antenna, $\tilde{y}_i$ denotes symbols received via the $i^{th}$ receive antenna through the QR decomposition, and $r_{ij}$ denotes an element of the upper triangular matrix which becomes the channel matrix after multiplying by the matrix Q.

The receiver sets the transmit symbols of the transmitter as the candidate values of $x_4$ in Equation (8). The detector 550 determines the Euclidean distances of the $x_4$ candidate values by computing $x_3$, $x_2$ and $x_1$ when $x_4$ is set as the first candidate to the last candidate through slicing. Next, the detector 550 sets the $x_4$ candidate value having the shortest Euclidean distance as $x_4$. In so doing, the detector 550 discards $x_3$, $x_2$ and $x_1$ values acquired from $x_4$ having the shortest Euclidean distance.

After determining $x_4$ in the first stage 551, the second stage 553 of the detector 550 selects $x_3$ having the shortest squared Euclidean distance in a similar way to Equation (8) using $x_4$ selected in the first stage 551. Also, the third stage 555 and the fourth stage 557 respectively select $x_2$ and $x_1$ having the shortest squared Euclidean distance in a similar way to Equation (8) using the values selected in the previous stages.

As such, using the QOC or the QRD-M, the receiver pre-determines and reuses the multiplication values overlapping in the signal detection. For the signal detection, the receiver normalizes the real part and the imaginary part of the receive symbols to integer values and converts the multiplication operation to a shift operation and an add operation. In so doing, the receiver can mitigate the implementation complexity of the signal detector as shown in Table 2. Table 2 shows the complexity when the multiplication and the addition are realized using the ASIC gate. In the multiplication and the addition using the ASIC gates, Table 2 assumes that the multiplication is 12 times more complicated than the addition.

TABLE 2

| 4 × 4 MIMO system | number of multiplications | number of additions | number of ASIC gates |
|---|---|---|---|
| QRD-M | 256(QR decomposition) + 10,848 = 11,104 | about 2,500 | 2,171,968 |
| QRD-M using normalization | 256(QR decomposition) + 1,568 = 1,824 | about 4,000 | 555,520 |
| QRD-M by reusing overlapping part | 256(QR decomposition) + 84 = 340 | about 16,000 | 321,280 |
| QOC | 256(QR decomposition) + 4,608 = 4,864 | about 600 | 943,488 |
| QOC using normalization | 256(QR decomposition) + 512 = 768 | about 800 | 127,232 |
| QOC by reusing overlapping part | 256(QR decomposition) + 84 = 340 | about 2,200 | 100,480 |

Since the complexity of the multiplication operation is greater than that of the add operation as shown in Table 2, an exemplary receiver of the present invention detects the signals by pre-calculating and reusing the multiplication values overlapping in the signal detection using the QRD-M or the QOC, or by normalizing the real part and the imaginary part of the receive symbols to integer values and transforming the real multiplication operation to the shift operation and the add operation, thus mitigating the computational complexity.

As discussed above, the MIMO detector of the receiver determines the Euclidean distances of the candidate symbols using the multiplication values pre-determined and stored according to the signal detection scheme. Although it is not illustrated, in hard decision, the MIMO detector determines a hard decision value of the symbols having the shortest squared Euclidean distance. Conversely, in soft decision, the MIMO detector determines a Log Likelihood Ratio (LLR) of the symbols having the shortest squared Euclidean distance.

Now, an exemplary method for lowering the computational complexity in the signal detection of a receiver is explained. Hereafter, the receiver is assumed to perform the soft decision.

Figure 6:
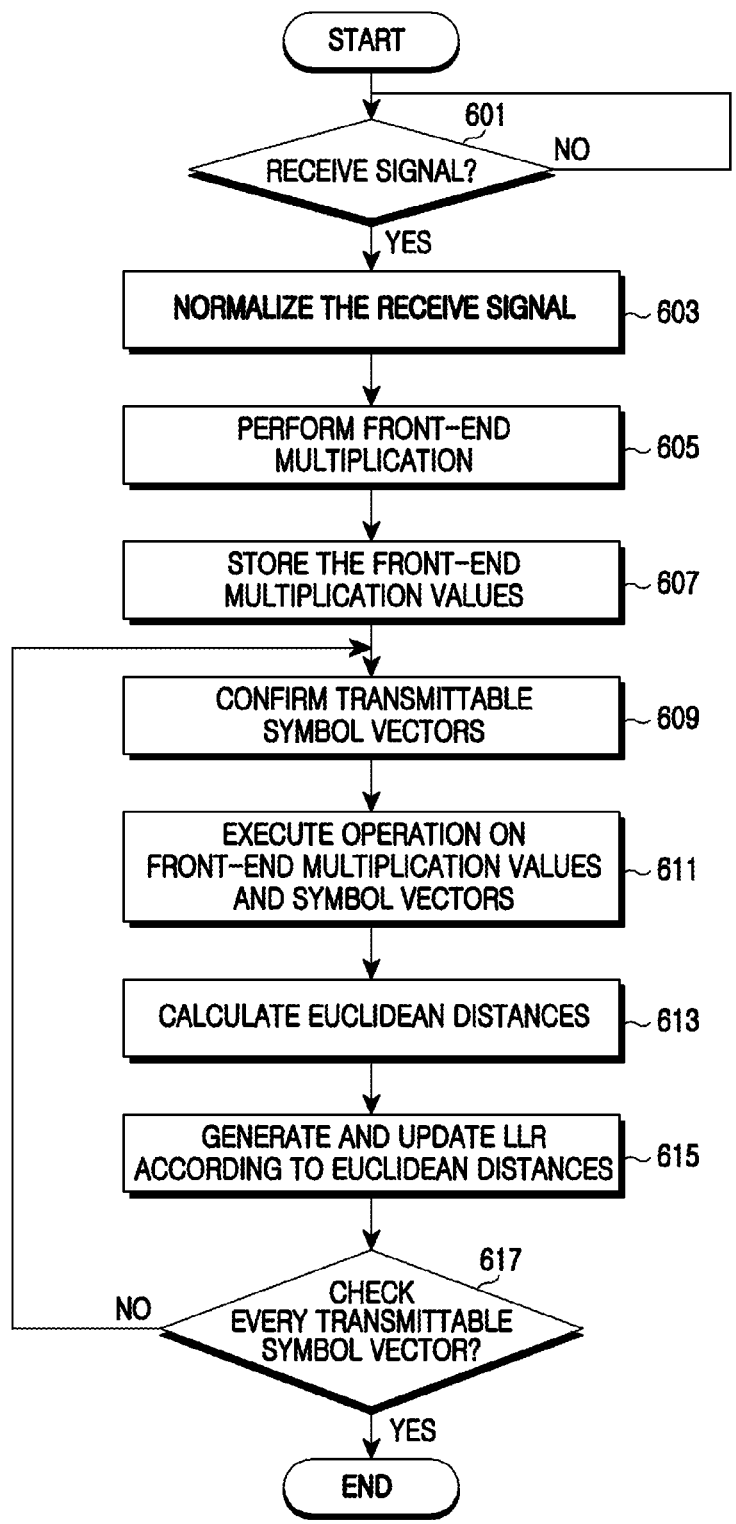
FIG. 6 illustrates a method for detecting a signal in a MIMO system according to an exemplary embodiment of the present invention.

FIG. 6 is a flowchart illustrating a method for detecting a signal in a MIMO system according to an exemplary embodiment of the present invention.

Referring to FIG. 6, in step 601, the receiver determines whether a signal is received over the plurality of the receive antennas.

When it is determined that a signal is received in step 601, the receiver normalizes the real part and the imaginary part of the symbols of the receive signal to integer values in step 603. For example, using the 16QAM scheme, the transmitter sends the real transmit symbols including the real part and the imaginary part as expressed in Equation (3). Thus, the receiver normalizes the real part and the imaginary part of the symbols of the receive signal to integer values by multiplying the symbols by $\sqrt{10}$.

In step 605, the receiver performs the front-end multiplication on the multiplications commonly used to determine the squares of the Euclidean distances between the receive signal and the transmittable symbols of the transmitter. For example, when calculating the square of the Euclidean distance based on Equation (2), the receiver performs the front-end multiplication on $\|y\|^2$, $y^H H$, and $\|H\|^2$ commonly used.

In step 607, the receiver stores the front-end multiplication values.

In step 609, the receiver confirms the transmittable symbol vectors of the transmitter. For example, using the ML method, the receiver confirms every transmittable symbol vector of the transmitter. Alternatively, using the ML method with the QR decomposition applied, the QRD-M, and the QOC, the receiver confirms the transmittable symbol vectors of the n-th transmit antenna of the transmitter.

In step 611, the receiver executes the operation of the front-end multiplication values stored in the storage and the confirmed symbol vectors. Since the receive symbols were normalized in step 603, the receiver may transform the multiplication of the front-end multiplication values and the symbol vectors into a shift operation and an add operation. Alternatively, the receiver may multiply the front-end multiplication values and the symbol vectors, without the normalization of step 603.

In step 613, the receiver determines the squares of the Euclidean distances of the transmit symbols using the operation value of the front-end multiplication values and the confirmed symbol vectors.

In step 615, the receiver generates an LLR value using the shortest squared Euclidean distance of the transmit symbols. The receiver updates an LLR value generated and stored in advance, with the generated LLR value.

In step 617, the receiver determines whether the Euclidean distance of every transmittable symbol vector of the transmitter is confirmed or not.

When the Euclidean distance of every transmittable symbol vector of the transmitter is not confirmed, the receiver confirms next transmittable symbol vectors in step 609.

When confirming every transmittable symbol vector of the transmitter, the receiver finishes this process.

Figure 7:
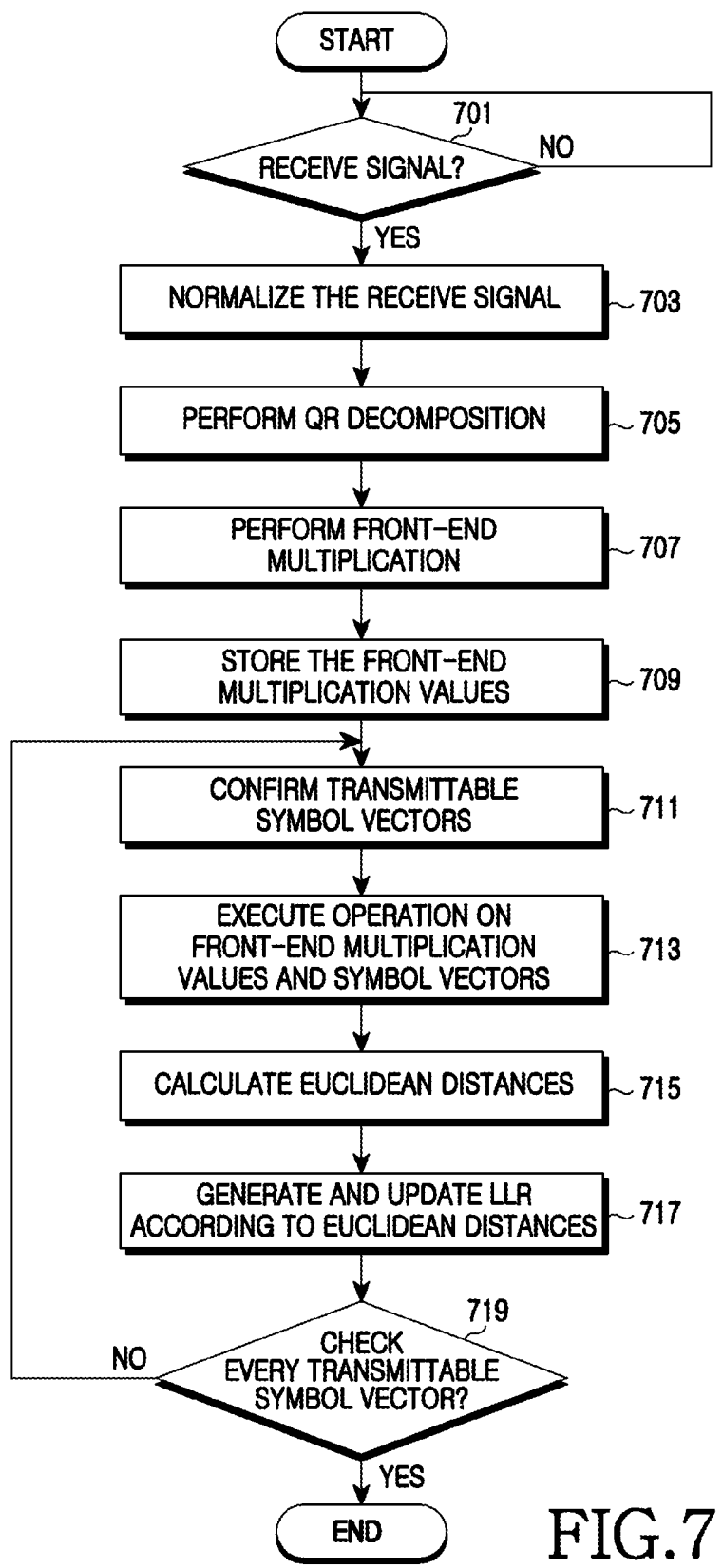
FIG. 7 illustrates a method for detecting a signal in a MIMO system according to another exemplary embodiment of the present invention.

FIG. 7 is a flowchart illustrating a method for detecting a signal in a MIMO system according to another exemplary embodiment of the present invention.

Referring to FIG. 7, in step 701, the receiver determines whether a signal is received over the plurality of the receive antennas.

When it is determined that a signal is received in step 701, the receiver normalizes the real part and the imaginary part of the symbols of the receive signal to integer values in step 703. For example, using the 16QAM scheme, the transmitter sends the real transmit symbols including the real part and the imaginary part as expressed in Equation (3). Thus, the receiver normalizes the real part and the imaginary part of the symbols of the receive signal to integer values by multiplying the symbols by $\sqrt{10}$.

In step 705, the receiver multiplies the receive signal by $Q^H$ so as to detect the signal using the property of the matrix R based on Equation 4. The receive signal is transformed into a form of facilitating the interference cancellation between the antennas as expressed in Equation (5). That is, the receiver performs the QR decomposition on the receive signal.

In step 707, the receiver performs the front-end multiplication on the multiplications commonly used to determine the squares of the Euclidean distances between the receive signal and the transmittable symbols of the transmitter. For example, when calculating the square of the Euclidean distance based on Equation (2), the receiver conducts the front-end multiplication on $\|y\|^2$, $y^H H$, and $\|H\|^2$ which are commonly used.

In step 709, the receiver stores the front-end multiplication values.

In step 711, the receiver confirms the transmittable symbol vectors of the transmitter. For example, using the ML method, the receiver confirms every transmittable symbol vector of the transmitter. Alternatively, using the ML method with the QR decomposition applied, the QRD-M, and the QOC, the receiver confirms the transmittable symbol vectors of the n-th transmit antenna of the transmitter.

In step 713, the receiver executes the operation of the front-end multiplication values stored in the storage and the confirmed symbol vectors. Since the receive symbols were normalized in step 703, the receiver may transform the multiplication of the front-end multiplication values and the symbol vectors into a shift operation and an add operation. Alternatively, the receiver may multiply the front-end multiplication values and the symbol vectors, without the normalization of step 703.

In step 715, the receiver determines the squares of the Euclidean distances of the transmit symbols using the operation value of the front-end multiplication values and the confirmed symbol vectors.

In step 717, the receiver generates LLR value using the shortest squared Euclidean distance of the transmit symbols. The receiver updates an LLR value generated and stored in advance, with the generated LLR value.

In step 719, the receiver determines whether the Euclidean distance of every transmittable symbol vector of the transmitter is confirmed or not.

When the Euclidean distance of every transmittable symbol vector of the transmitter is not confirmed, the receiver confirms next transmittable symbol vectors in step 711.

When confirming every transmittable symbol vector of the transmitter, the receiver finishes this process.

When the modulation level is changed, the number of the multiplications for the signal detection of the receiver does not vary. Yet, when the numbers of the transmit antennas and the receive antennas increase, the number of the multiplications does vary. Accordingly, the MIMO system having the set number of antennas can adopt an Adaptive Modulation and Coding (AMC) scheme without increasing the complexity.

In the signal detection described so far, the receiver reuses the multiplication values overlapping in the signal detection and also normalizes the real part and the imaginary part of the receive symbols to integer values.

Alternatively, the receiver can simply reuse the overlapping multiplication values, or simply normalize the receive symbols.

In light of the foregoing, the receiver of a MIMO system using spatial multiplexing normalizes the real part and the imaginary part of the receive symbols to integer values and executes every multiplication operation to acquire the square of the Euclidean distance by means of the front-end multiplier. Therefore, the computational complexity in the signal detection can be mitigated by detecting the multiplexed signal using the operation values.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for detecting a signal at a receiver in a multi-antenna system using spatial multiplexing, the apparatus comprising:
   at least one antenna for receiving a signal;
   a channel estimator for estimating a channel using the received signal;
   a detector for determining multiplication values commonly used to determine a Euclidean distance using the received signal and channel information and for detecting a transmitted signal by determining Euclidean distances of one or more candidate symbols using the received signal and the determined multiplication values, wherein the detector comprises:
a front-end multiplier for determining the multiplication values commonly used to determine the Euclidean distance using the received signal and the channel information;
a distance calculator for determining the Euclidean distances of one or more candidate symbols using the multiplication values acquired at the front-end multiplier and the received signal;
a signal detector for selecting a candidate symbol having the shortest Euclidean distance as a signal to detect amongst the Euclidean distances determined at the detector; and
a storage for storing the multiplication values determined at the front-end multiplier,
wherein the distance calculator determines a Euclidean distance of each candidate symbol using the multiplication values stored in the storage.

2. The apparatus of claim 1, further comprising:
a normalizer for normalizing a real part and an imaginary part of symbols of the received signal to integer values,
wherein the detector determines the multiplication values commonly used to determine the Euclidean distance using the normalized received signal and the channel information, and detects the transmitted signal by determining Euclidean distances of one or more candidate symbols using the normalized received signal and the determined multiplication values.

3. The apparatus of claim 1, wherein the front-end multiplier determines the Euclidean distances based on the following equation and pre-determines $\|y\|^2$, $y^H H$, and $\|H\|^2$ used in the following equation:

$$\|y - Hx\|^2 = yy^H - y^H Hx - (y^H Hx)^H + x^H H^H Hx$$
$$= \|y\|^2 + 2R\{(y^H H)x\} + \|H\|^2 \|x\|^2$$

where y denotes a signal received via the at least one receive antenna, x denotes a transmit signal sent from a transmitter, and H denotes a channel matrix.

4. The apparatus of claim 1, wherein the detector further comprises:
a QR decomposer for transforming the received signal using QR decomposition,
wherein the front-end multiplier determines multiplication values using the received signal transformed through the QR decomposition, and
the distance calculator determines the Euclidean distances using the multiplication values determined at the front-end multiplier and the receive signal transformed through the QR decomposition.

5. The apparatus of claim 1, wherein the distance calculator determines the Euclidean distances of the candidate symbols by applying a shift operation and an add operation to the multiplication values determined at the front-end multiplier.

6. The apparatus of claim 1, wherein the distance calculator determines the Euclidean distances using any one of Maximum Likelihood (ML), QR Decomposition (QRD)-M, and QR decomposition Order successive interference Cancellation (QOC).

7. The apparatus of claim 1, wherein the signal detector performs one of a hard decision and a soft decision using the shortest Euclidean distance amongst the Euclidean distances determined at the distance calculator.

8. The apparatus of claim 1, further comprising:
a deinterleaver for deinterleaving the detected signal according to an interleaving rule of a transmitter; and
a decoder for demodulating and decoding the deinterleaved signal.

9. A method for detecting a signal at a receiver in a multi-antenna system using spatial multiplexing, the method comprising:
estimating a channel using a received signal;
determining multiplication values commonly used to determine a Euclidean distance using the received signal and channel information;
detecting a transmitted signal by determining Euclidean distances of one or more candidate symbols using the determined multiplication values and the received signal; and
storing the determined multiplication values in a storage,
wherein the Euclidean distances of the candidate symbols are determined using the multiplication values stored in the storage and the normalized symbol.

10. The method of claim 9, further comprising:
normalizing a real part and an imaginary part of symbols of the received signal to integer values,
wherein the multiplication values commonly used to determine a Euclidean distance are determined using the normalized receive signal and the channel information, and the signal is detected by determining Euclidean distances of one or more candidate symbols using the normalized received signal and the determined multiplication values.

11. The method of claim 9, wherein the Euclidean distances are determined based on the following equation:

$$\|y - Hx\|^2 = yy^H - y^H Hx - (y^H Hx)^H + x^H H^H Hx$$
$$= \|y\|^2 + 2R\{(y^H H)x\} + \|H\|^2 \|x\|^2$$

where y denotes a signal received via the at least one receive antenna, x denotes a transmit signal sent from a transmitter, and H denotes a channel matrix.

12. The method of claim 11, wherein the determining of the multiplication values commonly used comprises:
pre-determining $\|y\|^2$, $y^H H$, and $\|H\|^2$ commonly used to determine the Euclidean distances.

13. The method of claim 9, wherein the detecting of the signal comprises:
determining the Euclidean distances of the candidate symbols by applying a shift operation and an add operation to the determined multiplication values; and
selecting a candidate symbol having the shortest Euclidean distance as a signal to detect amongst the determined Euclidean distances.

14. The method of claim 13, wherein the detecting of the signal further comprises:
performing one of a hard decision and a soft decision on the candidate symbol having the shortest Euclidean distance amongst the Euclidean distances.

15. The method of claim 9, wherein the detecting of the signal comprises using any one of Maximum Likelihood (ML), QR Decomposition (QRD)-M, and QR decomposition Order successive interference Cancellation (QOC).

16. The method of claim 9, further comprising:
transforming the received signal using QR decomposition,
wherein the multiplication values commonly used to determine the Euclidean distances are acquired using the received signal transformed through the QR decomposition and the channel information, and
the signal is detected by determining the Euclidean distances of the one or more candidate symbols using the receive signal transformed through the QR decomposition and the determined multiplication values.

17. The method of claim 9, further comprising:
deinterleaving the detected signal according to an interleaving rule of a transmitter; and
demodulating and decoding the deinterleaved signal.

* * * * *